(12) United States Patent  
Prochello et al.

(10) Patent No.: US 9,144,916 B2  
(45) Date of Patent: Sep. 29, 2015

(54) SYSTEM AND METHOD OF REMOVING BEADS FROM TIRES

(71) Applicant: Eagle International, LLC, Dakota Dunes, SD (US)

(72) Inventors: Julie K. Prochello, Dakota Dunes, SD (US); Les Pederson, Dakota Dunes, SD (US); Dennis Metz, Oakland, NE (US); Joe Brehmer, Lyons, NE (US)

(73) Assignee: EAGLE INTERNATIONAL, LLC, Dakota Dunes, SD (US)

( * ) Notice: Subject to any disclaimer, the term of this patent is extended or adjusted under 35 U.S.C. 154(b) by 288 days.

(21) Appl. No.: 13/763,409

(22) Filed: Feb. 8, 2013

(65) Prior Publication Data

US 2013/0205963 A1  Aug. 15, 2013

Related U.S. Application Data

(60) Provisional application No. 61/597,375, filed on Feb. 10, 2012.

(51) Int. Cl.
*B26F 1/00* (2006.01)
*B26F 1/02* (2006.01)
*B26D 3/00* (2006.01)
*B29B 17/02* (2006.01)
*B26F 1/38* (2006.01)
*B29L 30/00* (2006.01)

(52) U.S. Cl.
CPC .............. *B26F 1/0084* (2013.01); *B26D 3/005* (2013.01); *B26F 1/02* (2013.01); *B26F 2001/3886* (2013.01); *B29B 17/02* (2013.01); *B29L 2030/00* (2013.01); *B29L 2030/001* (2013.01); *Y02W 30/622* (2015.05); *Y02W 30/68* (2015.05); *Y10T 83/051* (2015.04); *Y10T 83/4635* (2015.04)

(58) Field of Classification Search
CPC .. B26F 1/0084; B26F 1/02; B26F 2001/3886; B26D 3/005; B29L 2030/001; B29L 2030/00; B29B 17/02
USPC ........................................................... 83/951
See application file for complete search history.

(56) References Cited

U.S. PATENT DOCUMENTS

| | | | | |
|---|---|---|---|---|
| 1,459,693 A | * | 6/1923 | Rand | 156/718 |
| 3,838,492 A | * | 10/1974 | Uemura | 29/403.3 |
| 3,911,772 A | * | 10/1975 | Kisielewski | 83/278 |
| 3,922,942 A | * | 12/1975 | Fawcett et al. | 83/620 |
| 4,137,101 A | * | 1/1979 | Stock | 29/22 |
| 4,338,839 A | * | 7/1982 | Farrell et al. | 83/620 |
| 4,338,840 A | * | 7/1982 | Farrell et al. | 83/622 |
| 4,355,556 A | * | 10/1982 | Ulsky | 83/124 |
| 4,694,716 A | * | 9/1987 | Sakamoto | 83/112 |
| 4,738,172 A | * | 4/1988 | Barclay | 83/18 |
| 4,873,759 A | * | 10/1989 | Burch | 29/700 |
| 5,054,351 A | * | 10/1991 | Jolliffe et al. | 83/430 |
| 5,235,888 A | * | 8/1993 | Dom | 83/420 |

(Continued)

*Primary Examiner* — Sean Michalski
(74) *Attorney, Agent, or Firm* — Perkins Coie LLP (57) ABSTRACT

A system and method for removes steel beads from large diameter tires by making a series of overlapping punched cuts in a circumferential pattern in the sidewall of the tire around the beads. The punching mechanism is hydraulically operated and remains stationary while a powered roller advances the tire after each successive punching motion until the beads have completely severed from both sidewalls of the OTR tire. The machine is capable of either simultaneously or individually removing both rubber-encased inner beads from the tire.

3 Claims, 10 Drawing Sheets

(56) References Cited

U.S. PATENT DOCUMENTS

| | | | | |
|---|---|---|---|---|
| 5,267,496 A * | 12/1993 | Roach et al. | | 83/133 |
| 5,551,325 A * | 9/1996 | Schutt | | 83/133 |
| 5,765,727 A * | 6/1998 | Masley | | 225/3 |
| 5,783,035 A * | 7/1998 | Pederson | | 156/763 |
| 5,868,328 A * | 2/1999 | Luoma | | 241/101.2 |
| 6,240,819 B1 * | 6/2001 | Su et al. | | 83/176 |
| 6,257,113 B1 * | 7/2001 | Lederbauer | | 83/620 |
| 6,467,383 B1 * | 10/2002 | Charbonnier | | 83/76.6 |
| 7,975,579 B1 * | 7/2011 | Pederson | | 82/1.11 |
| 8,225,701 B2 * | 7/2012 | Vainer et al. | | 83/54 |
| 2002/0035908 A1 * | 3/2002 | Kawashima et al. | | 83/368 |
| 2003/0024369 A1 * | 2/2003 | Dunn et al. | | 83/733 |
| 2004/0107811 A1 * | 6/2004 | Schmeling | | 83/178 |
| 2008/0314216 A1 * | 12/2008 | Delgado et al. | | 83/452 |
| 2009/0165619 A1 * | 7/2009 | Lacey et al. | | 83/184 |
| 2011/0023668 A1 * | 2/2011 | McMahon et al. | | 83/13 |
| 2013/0205963 A1 * | 8/2013 | Prochello et al. | | 83/36 |
| 2014/0174637 A1 * | 6/2014 | Chevaux | | 156/117 |

* cited by examiner

SYSTEM AND METHOD OF REMOVING BEADS FROM TIRES

CROSS REFERENCE

This application claims the benefit of U.S. Provisional Application No. 61/597,375, filed Feb. 10, 2012, the disclosure of which is hereby incorporated by reference in its entirety.

BACKGROUND

Off-the-road (OTR) tires include tires for construction vehicles such as wheel loaders, backhoes, graders, trenchers, and the like, as well as large mining trucks. OTR tires can be of either bias or radial construction, although the industry is trending toward increasing use of radial. Bias OTR tires are built with a large number of reinforcing plies to withstand severe service conditions and high loads.

Disposal of large diameter OTR tires used in construction and mining is a growing, global concern. The physical properties of OTR tires differ significantly from passenger and truck tires, and require specialized processes to ensure a safe and cost-effective means to reduce the overall mass to a workable size for further processing. For perspective, a typical truck tire may weigh one hundred thirty pounds and measure forty two inches in diameter. However, a typical OTR tire weighs around seven thousand pounds and measures nearly twelve feet in diameter. OTR tires also have very large steel beads disposed within the edges of the central tire openings that provide stability to the sidewalls and seal the tire to the rim. In some instances, the beads may account for up to five percent of the total tire weight.

The large steel beads located in the OTR tires represent a distinct problem for tire recyclers. There are some tire shredding machines capable of cutting through these large beads; however, this significantly increases the wear and maintenance costs of the equipment. By removing the bead prior to shredding, tire recyclers are able to reduce these costs and increase the life of their equipment.

Previous owners of scrapped OTR tires face a different problem. Many do not want the tires to be repaired and re-used in order to mitigate potential liability that could arise over defective tires. Most damaged OTR tires can be repaired as long as the casing and bead are still in reasonably good condition. Occasionally, tires will be repaired and resold without the prior owner's knowledge. However, an OTR tire cannot be repaired if the bead has removed. Accordingly, a cost effective method of removing the beads from OTR tires would be desirable to owners of scrapped OTR tires who do not want the tires to be repaired or reused. Presently, there are no machines on the market that are capable of removing the whole bead from an OTR tire.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A tire bead removing system and methods of use are presented to selectively remove one or both steel beads from various types and sizes of tires. The tire bead removing system removes the beads from the tires by making a series of overlapping punched cuts in a circumferential pattern in the sidewall of the tire around the beads. In various embodiments, the punching mechanism of the tire bead removing system remains stationary while one or more powered rollers advance the tire through a rotational movement after each successive punching motion of the punching mechanism until the beads have then severed from the sidewalls of the tire.

In various embodiments, a roller arm assembly supports the weight of a tire within the tire bead removing system and advances the tire through a rotational motion during the bead removal process. In some embodiments, the roller arm assembly includes a left hand roller bracket, which rotatably supports a powered roller bar, and a right hand roller bracket, which rotatably supports a non-powered roller bar. A punch arm assembly is positioned, during a bead removing operation, to extend between the left hand roller bracket and right hand roller bracket. The punch arm assembly includes a pair of punch blade mounts and punch blades that are faced opposite one another and moved toward and away from one another by a pair of punch power cylinders.

In various embodiments, a cage assembly is associated with the tire bead removing system to protect the operator from the rotating tire. The cage assembly, in some embodiments, includes a left hand cage arm and a right hand cage arm that are pivotally coupled with a cage connecting bar, which includes a right connecting bar and left connecting bar that may slideably move along one another's lengths in order to lengthen and shorten the cage connecting bar. Pairs of cage hinge pins and cage power cylinders are coupled with the left hand cage arm and the right hand cage arm to extend and retract the cage arms between open and closed positions.

In some embodiments, the tire bead removing system may be provided in a portable arrangement, wherein the tire bead removing system is coupled with a trailer. A loading power cylinder may be associated with the trailer such that it extends between the trailer and the support frame of the tire bead removing system. The tire bead removing system may be securely positioned atop a ground or operating surface with the loading power cylinder. When the user needs to load the tire bead removing system into a transport position, the loading power cylinder retracts, tipping the tire bead removing system in a rearward direction until its support frame is supported on the trailer.

In at least one method of use, the user actuates a control station assembly to open the cage assembly so that a tire may be loaded onto the tire bead removing system. The tire is positioned so that the roller arm assembly and the punch arm assembly penetrate the central opening of the tire and the beads of the tire rest on the powered roller bar and non-powered roller bar. The cage assembly is then actuated to move into a closed position around the tire. The operator may then actuate the punch arm assembly controls so that one or both of the punch power cylinders are actuated and drive the punch blades toward one another until they engage and penetrate the sidewalls of the tire, adjacent the bead. The punch power cylinders are again actuated in a reverse order in order to retract the punch blades. The powered roller bar is then actuated to rotate the tire a distance slightly less than a width of the punch blades. The process may then be repeated by advancing and retracting the punch blades, followed by advancing of the tire with the powered roller bar until the tire has completed a full rotation and the tire beads have been severed from the sidewalls of the tire.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1A:
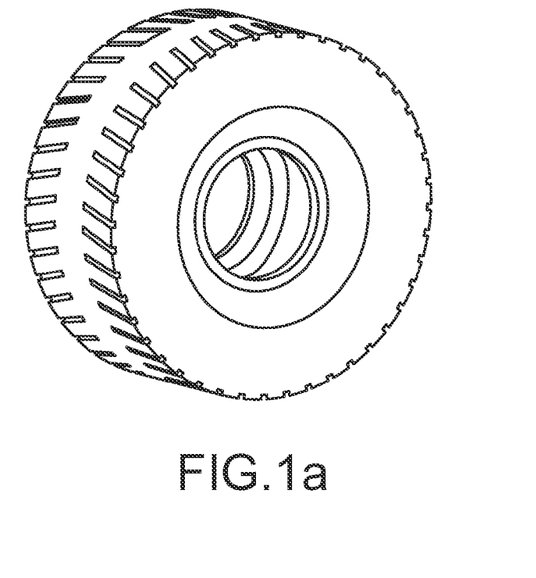
FIG. 1a depicts a perspective view of an off-the-road tire with its sidewall and bead intact.
Figure 1B:
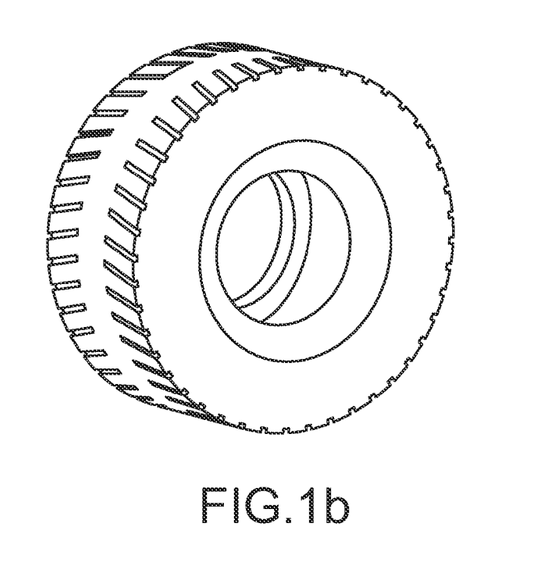
FIG. 1b depicts a perspective view of the off-the-road tire of FIG. 1a with its bead and a portion of its sidewall removed.

A tire bead removing system and methods of use are presented to selectively remove one or both steel beads from various types and sizes of tires. In various embodiments, the tire bead removing system 10 is used to remove steel beads from large diameter tires, such as OTR tires. FIG. 1a depicts an example of an OTR tire with its bead and sidewall intact. FIG. 1b depicts that same OTR tire after the bead has been cut from the sidewall. The tire bead removing system 10 removes the beads from the tires by making a series of overlapping punched cuts in a circumferential pattern in the sidewall of the tire around the beads. In various embodiments, the punching mechanism of the tire bead removing system 10 remains stationary while one or more powered rollers advance the tire through a rotational movement after each successive punching motion of the punching mechanism until the beads have then severed from the sidewalls of the tire.

Figure 2A:
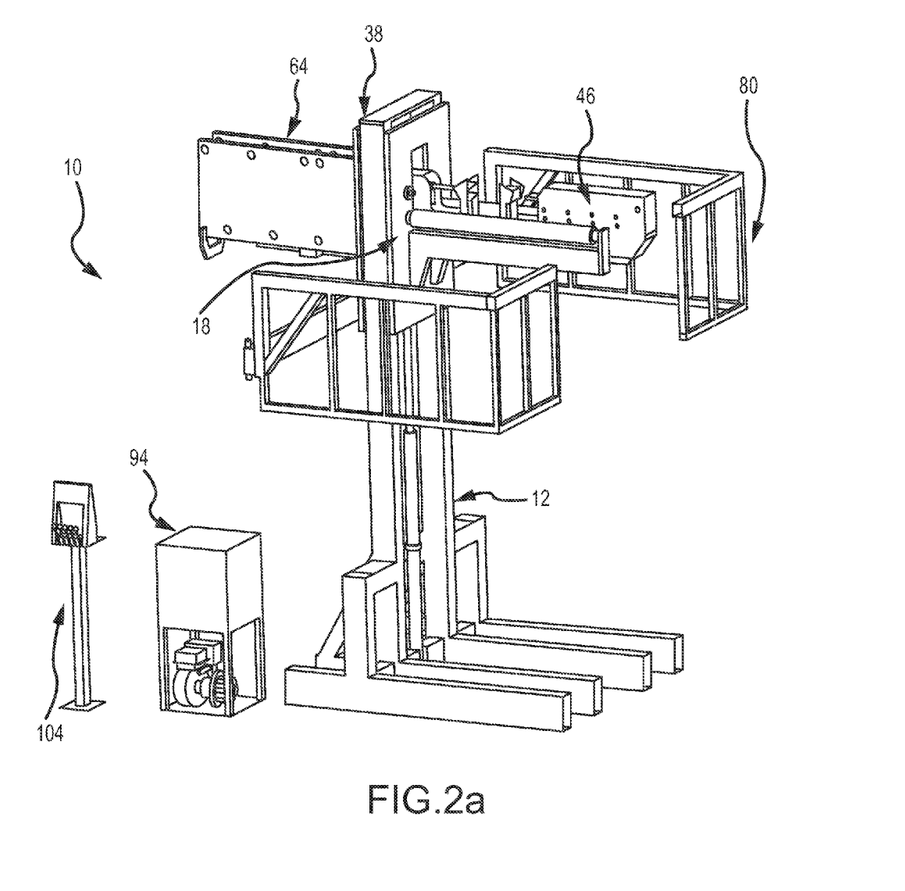
FIG. 2a depicts a perspective view of one embodiment of the tire bead removing system of the present technology.
Figure 2B:
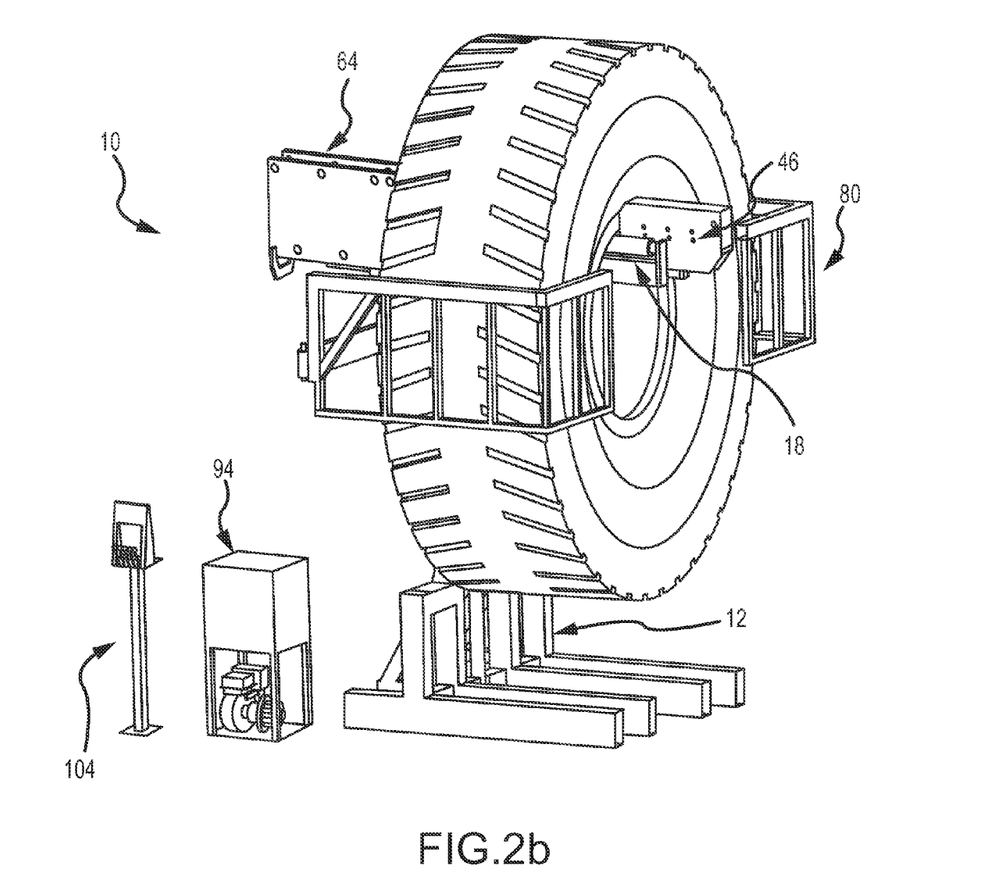
FIG. 2b depicts a perspective view of the tire bead removing system of FIG. 2a and one manner in which it may support a tire.
Figure 3:
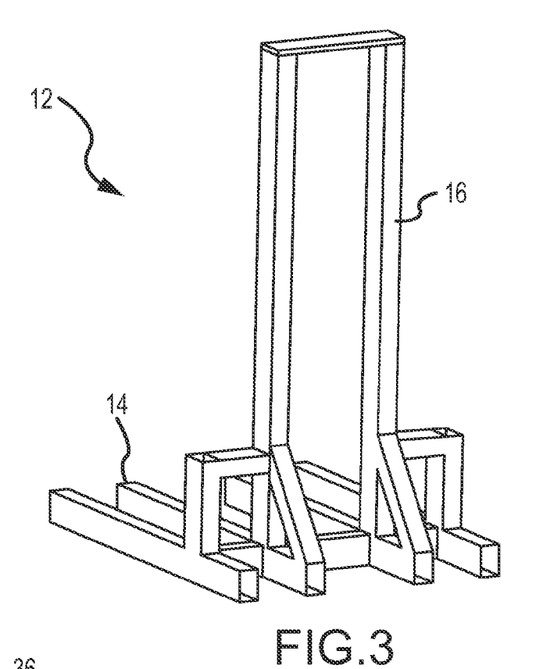
FIG. 3 depicts a perspective view of one embodiment of a base frame that may be used with the tire bead removing system of the present technology.

With reference to FIGS. 2a-11, embodiments of the tire bead removing system 10 are depicted in their various component parts and configurations. With particular reference to FIG. 3a, support frame 12 includes a base portion 14 that is configured to engage an operating surface that will support the tire bead removing system 10. The exemplary embodiments are depicted as having a base portion 14 formed from a plurality of horizontally spaced-apart tubular frame members that are secured to one another near a rearward end of the base portion 14. However, it is contemplated that the base portion 14 could be configured in a variety of shapes and structural orientations that provide a sturdy support that engages an operating surface, such as a shop floor. An upright portion 16 extends upwardly from the base portion 14. While the exemplary embodiments depict a pair of spaced-apart tubular frame members that are supported by lower brace members, a wide variety of configurations may be provided to support the aforedescribed system components in a manner that provides a secure operating platform for the tire bead removing system 10. FIG. 3 depicts an exemplary embodiment of a support frame 12 that may be used with the present technology. FIGS. 2a and 2b depict a plurality of components that may be configured with the support frame 12 in order to provide at least one embodiment of the tire bead removing system 10.

Figure 4:
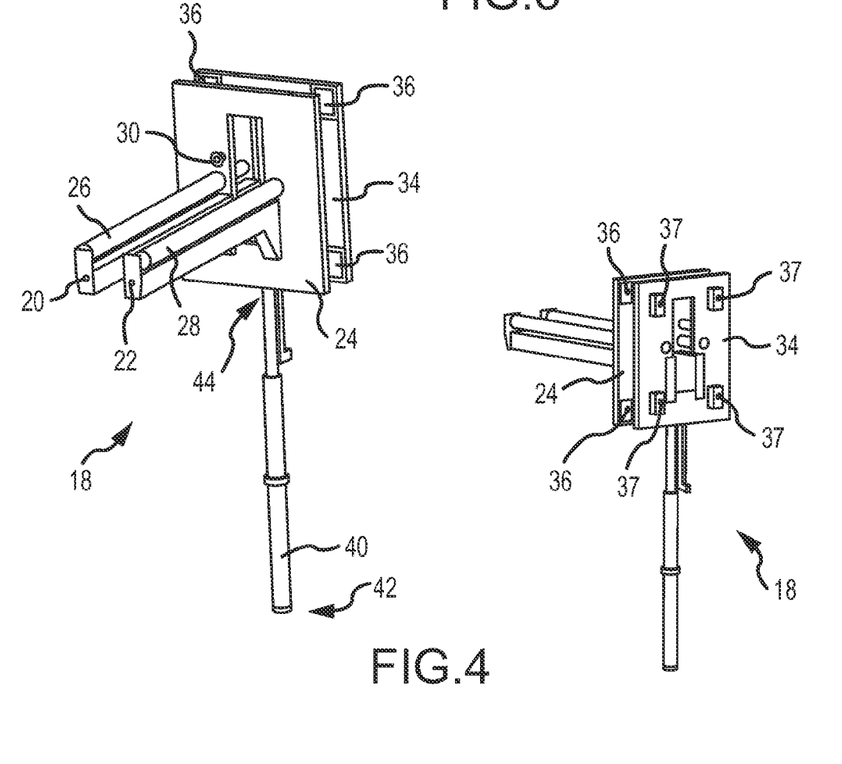
FIG. 4 depicts a front perspective view and a rear perspective view of one embodiment of a roller arm assembly that may be used with the tire bead removing system of the present technology.

With reference to FIGS. 2a, 2b and 4, the tire bead removing system 10 is provided with a roller arm assembly 18 that supports the weight of a tire within the tire bead removing system 10 and advances the tire through a rotational motion during the bead removal process. In various embodiments, the roller arm assembly 18 includes a left-hand roller bracket 20 and a right-hand roller bracket 22 that extend outwardly from a roller arm mounting plate 24. The left hand roller bracket 20 and right hand roller bracket 22 are positioned in a horizontally spaced-apart fashion and cantilever outwardly from the roller arm mounting plate 24. The left hand roller bracket 20 rotatably supports a powered roller bar 26. Similarly, the right hand roller bracket 22 rotatably supports a non-powered roller bar 28 along its length. In various embodiments, the powered roller bar 26 is a chain driven roller bar that is powered by an orbit motor 30, located behind the roller arm mounting plate 24. Other conventional motors are contemplated for use with the powered roller bar 26 and may include various belt drive systems and the like in replacement of the chain driven mechanism described. In some embodiments, the non-powered roller bar 28 is coupled with the right hand roller bracket 22 so that it may rotate freely in either direction when a force is acted upon it.

With continued reference to FIGS. 2a, 2b and 4, a slide assembly 32 includes a slide assembly plate 34 that is positioned in a spaced-apart and generally parallel relationship with the roller arm mounting plate 24. A plurality of slide wear plates 36 are disposed on inward facing surfaces of the roller arm mounting plate 24 and the slide assembly plate 34. The slide wear plates 36 are positioned to engage opposite surfaces of frame members within the upright portion 16 of the support frame 12. Slide wear pads 37 are secured to the opposite surface of the roller arm mounting plate 24. One or more removable side plates 38 may be removably secured with the edge portions of the roller arm mounting plate 24 and the slide assembly plate 34 in order to shield the orbit motor 30 and chain drive system from debris. The slide assembly 32 further includes a power cylinder 40, which may be provided in the form of a multi-segmented hydraulic cylinder of various types. In some embodiments, a base end portion 42 of the power cylinder 40 is secured with the base portion 14 of the support frame 12. A distal end portion 44 of the power cylinder 40 may be secured with the slide assembly plate 34. In this manner, actuation of the power cylinder 40 will guide the slide assembly 32 in linear movement along the upright portion 16 of the support frame 12. Accordingly, the roller arm assembly 18 may be adjusted in height to accommodate tires of various diameters.

Figure 5:
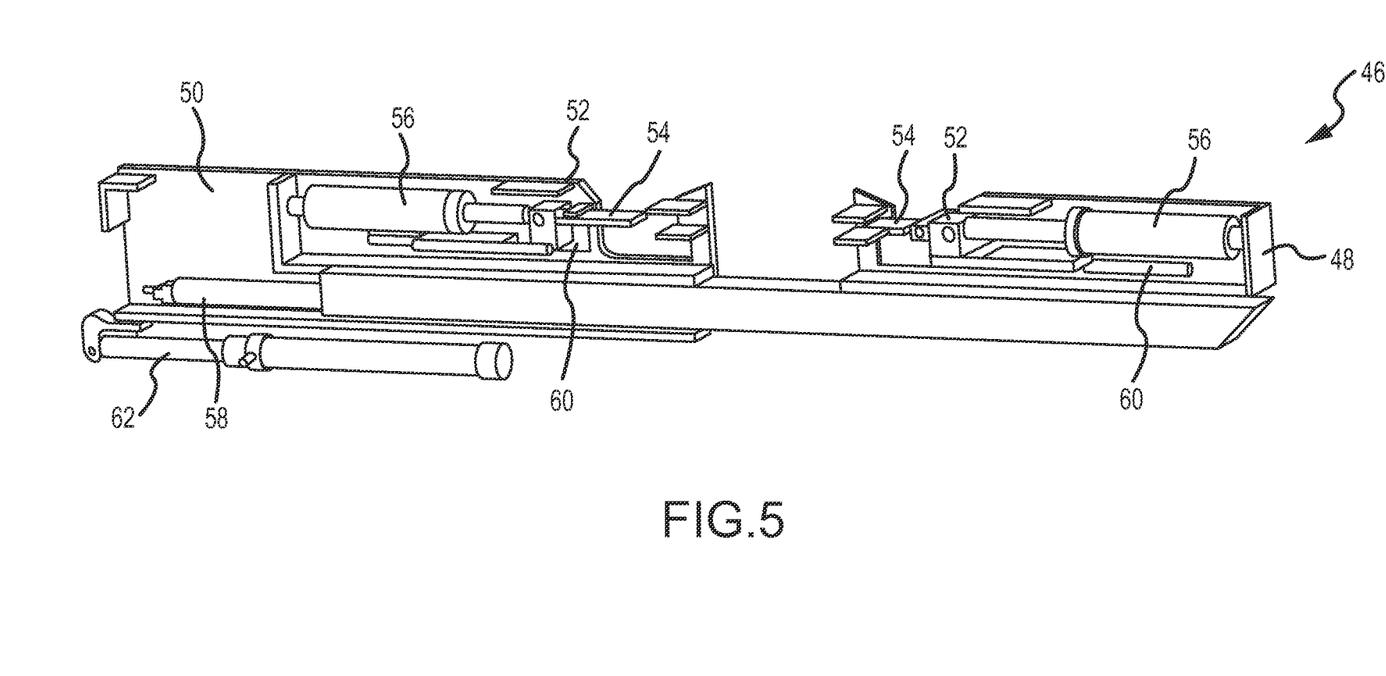
FIG. 5 depicts a perspective view of one embodiment of a punch arm assembly that may be used with the tire bead removing system of the present technology.

With reference to FIGS. 2a, 2b and 5, the tire bead removing system 10 is provided with a punch arm assembly 46 that, during a bead removing operation, may extend between the left hand roller bracket 20 and right hand roller bracket 22. The punch arm assembly 46 is generally provided with an outer punch arm support 48 and an opposite inner punch arm support 50. Each of the punch arm supports include a punch blade mount 52 and a punch blade 54. Punch power cylinders 56 are associated with each of the outer punch arm support 48 and inner punch arm support 50. Specifically, base end portions of the punch power cylinders 56 are coupled with the punch arm supports. Opposite, distal end portions of the punch power cylinders 56 are operatively coupled with the punch blade mounts 52. The punch blade mounts 52 support the punch blade 54 so that they are oppositely faced and co-planar with one another. In this manner, actuation of one or both of the punch power cylinders 56 will advance and/or retract the punch blades 54 toward or away from one another. Two blade backer assemblies 55 are positioned in horizontally spaced-apart relationship with one another along a length of the punch arm assembly 46. In the depicted embodiments, two vertically spaced-apart backer plates 57 extend outwardly from a backer support arm 59. The backer plates 57 are positioned so that the punch blades pass at least partially through the space between the backer plates 57. In this manner materials, such as tire sidewalls, may be positioned between the punch blades 54 and the backer plates 57; the backer plates preventing rearward deflection of the sidewalls as they are penetrated by the punch blades 54.

In various embodiments, the punch power cylinders may be operated simultaneously or separately from one another. An outer punch arm power cylinder 58 may be secured with the inner punch arm support 50 at a base end portion of the power cylinder and, at a distal end portion, with a slide rail 60 on which the outer punch arm support 58 may be mounted. In this configuration, the outer punch arm support 58 and its punch blade 54 may be moved toward and away from the inner punch arm support 50 to accommodate different tire widths throughout a bead removing operation with tires of various widths. A punch arm extension power cylinder 62 may be provided for moving the punch arm assembly 46 through extended and retracted positions for use in bead removing and storage purposes.

Figure 6:
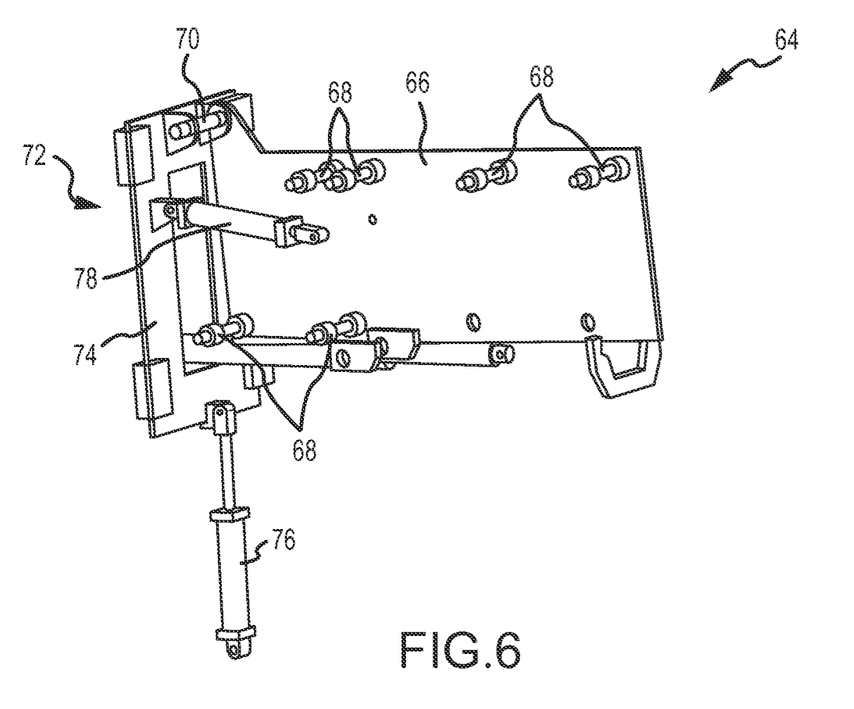
FIG. 6 depicts a perspective view of one embodiment of a roller arm retract housing that may be used with the tire bead removing system of the present technology.
Figure 7:
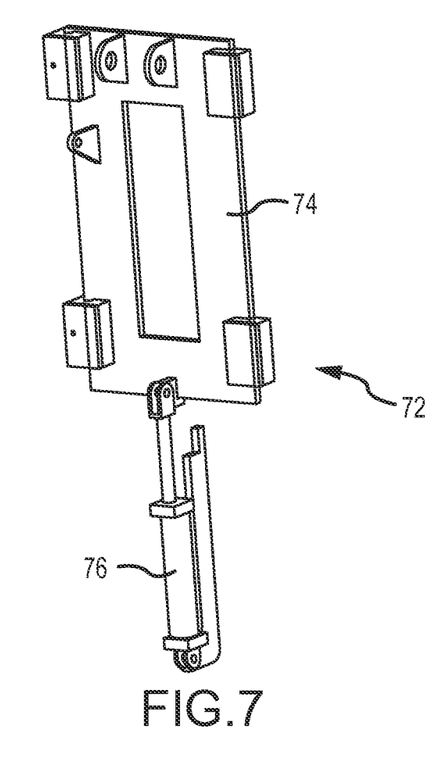
FIG. 7 depicts a perspective view of one embodiment of a cutter adjustment slide assembly that may be used with the tire bead removing system of the present technology.

With reference to FIG. 6, the tire bead removing system 10 may be provided with a roller arm retract housing 64, which is used as a guide and a protective guard for the punch arm assembly 46 when it is in a retracted position. The roller arm retract housing 64 includes housing plates 66, positioned in a spaced-apart fashion to accommodate the punch arm assembly 46 therebetween. A plurality of roller pins 68 are disposed within the roller arm retract housing 64 to engage and support the punch arm assembly 64 as it is advanced and retracted within the roller arm retract housing 64. An upper mounting pin 70 pivotally couples the roller arm retract housing 64 with a cutter adjustment slide assembly 72. With reference to FIG. 7, the cutter adjustment slide assembly 72 may be provided with a slide assembly mounting plate 74 that is coupled with a rearward portion of the roller arm assembly 18 and is attached to the roller arm retract housing 64 via an upper mounting pin 70. A slide power cylinder 76 is coupled with a lower end portion of the slide assembly mounting plate 74. The cutter adjustment slide assembly 72 is, in various embodiments, designed to engage the slide wear pads 37 attached to a rearward side of the roller arm and slide assembly. In some embodiments, the cutter adjustment slide assembly 64 moves both the punch arm assembly 46 and the roller arm retract housing 64 independently of the roller arm and slide assembly. A tilt power cylinder 78 extends between the roller arm retract housing 64 and the slide assembly mounting plate 74 in order to provide selective tilting movement between the two structures.

Figure 8:
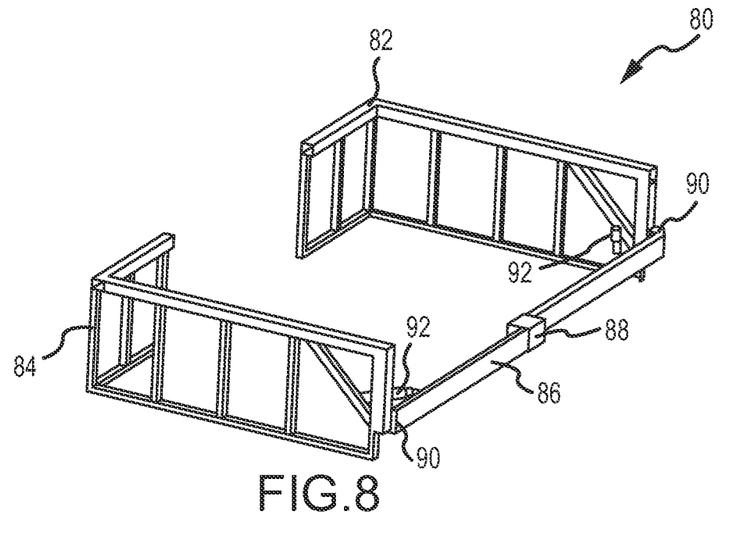
FIG. 8 depicts a perspective view of one embodiment of a cage assembly that may be used with the tire bead removing system of the present technology.

With reference to FIG. 8, a cage assembly 80 is associated with the tire bead removing system 10 to protect the operator from the rotating tire. In various embodiments, the cage assembly 80 is provided with a left hand cage arm 82 and a right hand cage arm 84. In the depicted embodiment, the cage arms are provided in a right angle configuration to extend along the tread surface and outward facing sidewall of the tire, such as depicted in FIG. 2b. The left hand cage arm 82 and right hand cage arm 84 are pivotally coupled with a cage connecting bar 86 that includes a right connecting bar and left connecting bar that may slideably move along one another's lengths in order to lengthen and shorten the cage connecting bar 86. A connecting bar mounting bracket 88 is disposed at a midpoint along a length of the cage connecting bar 86 and houses the right and left connecting bar portions as they may be adjusted in position with respect to one another. A pair of cage hinge pins 90 and cage power cylinders 92 are coupled between each of the left hand cage arm 82, the right hand cage arm 84 and the cage connecting arm 86. Accordingly, in this configuration, actuation of the cage power cylinders 92 will extend and retract the left hand cage arm 82 and the right hand cage arm 84 between open and closed positions with respect to a tire being cut within the system. The connecting bar mounting bracket 88 may be secured with the upper portion 16 of the support frame 12.

Figure 9:
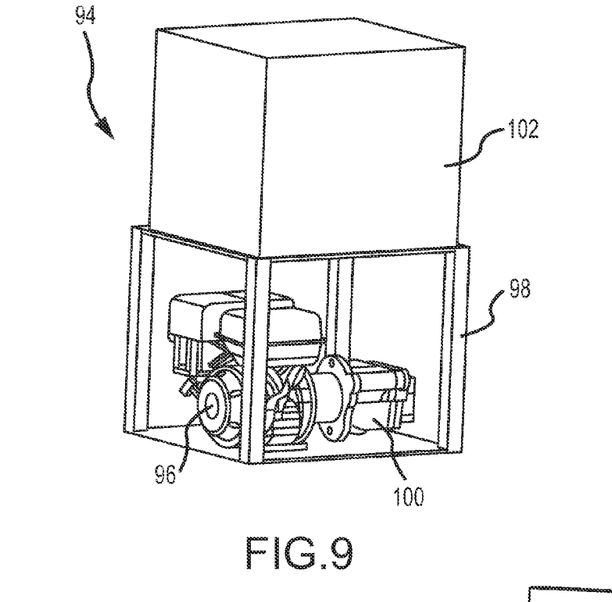
FIG. 9 depicts a perspective view of one embodiment of a power unit assembly that may be used with the tire bead removing system of the present technology.
Figure 10:
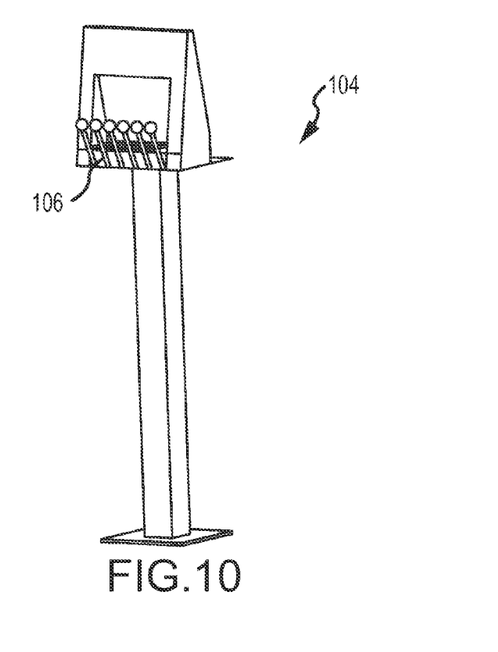
FIG. 10 depicts a perspective view of one embodiment of a control station assembly that may be used with the tire bead removing system of the present technology.

With reference to FIG. 9, a power unit assembly 94 may be associated with the tire bead removing system 10. In various embodiments, the power unit assembly 94 may include a motor 96, a motor housing 98, a hydraulic pump 100 and a hydraulic oil tank 102. Such power unit assemblies are well known and used in various arts and further description is not necessary herein. Suffice it to say that the power unit assembly 94 provides hydraulic power to the various power cylinders associated within the tire bead removing system 10. With reference to FIG. 10, a control station assembly 104 may be provided to support various control valves 106 that activate the hydraulic components of the tire bead removing system 10. As those of skill in the art will appreciate, hydraulic hoses (not depicted) will extend from the power unit assembly 94 to the control station assembly 104 and then to the hydraulic components located within the tire bead removing system 10.

Figure 11A:
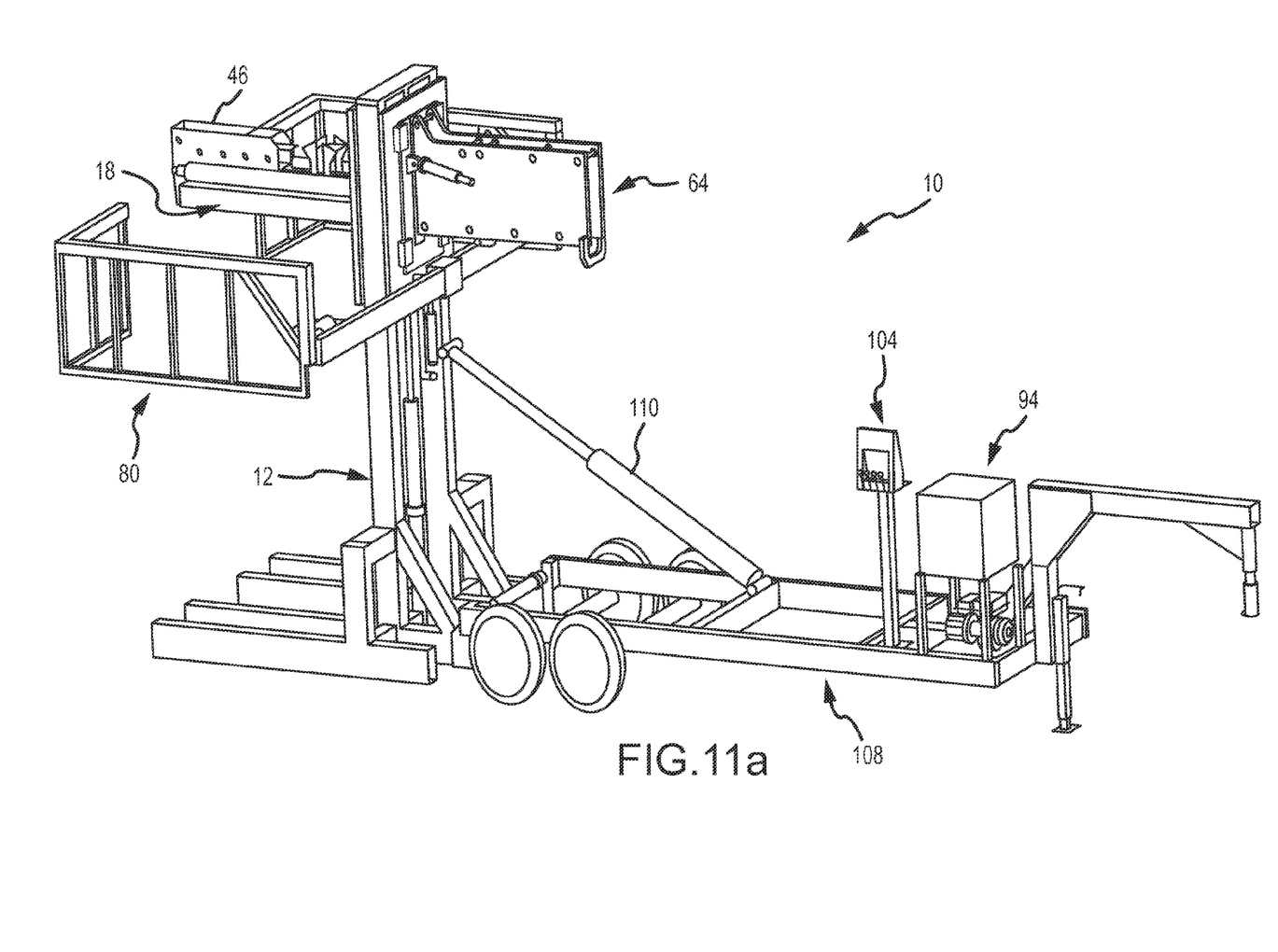
FIG. 11a depicts a rear perspective view of one embodiment of a one embodiment of the tire bead removing system of the present technology and one manner in which the system may be coupled with a mobile trailer and placed in a use position.
Figure 11B:
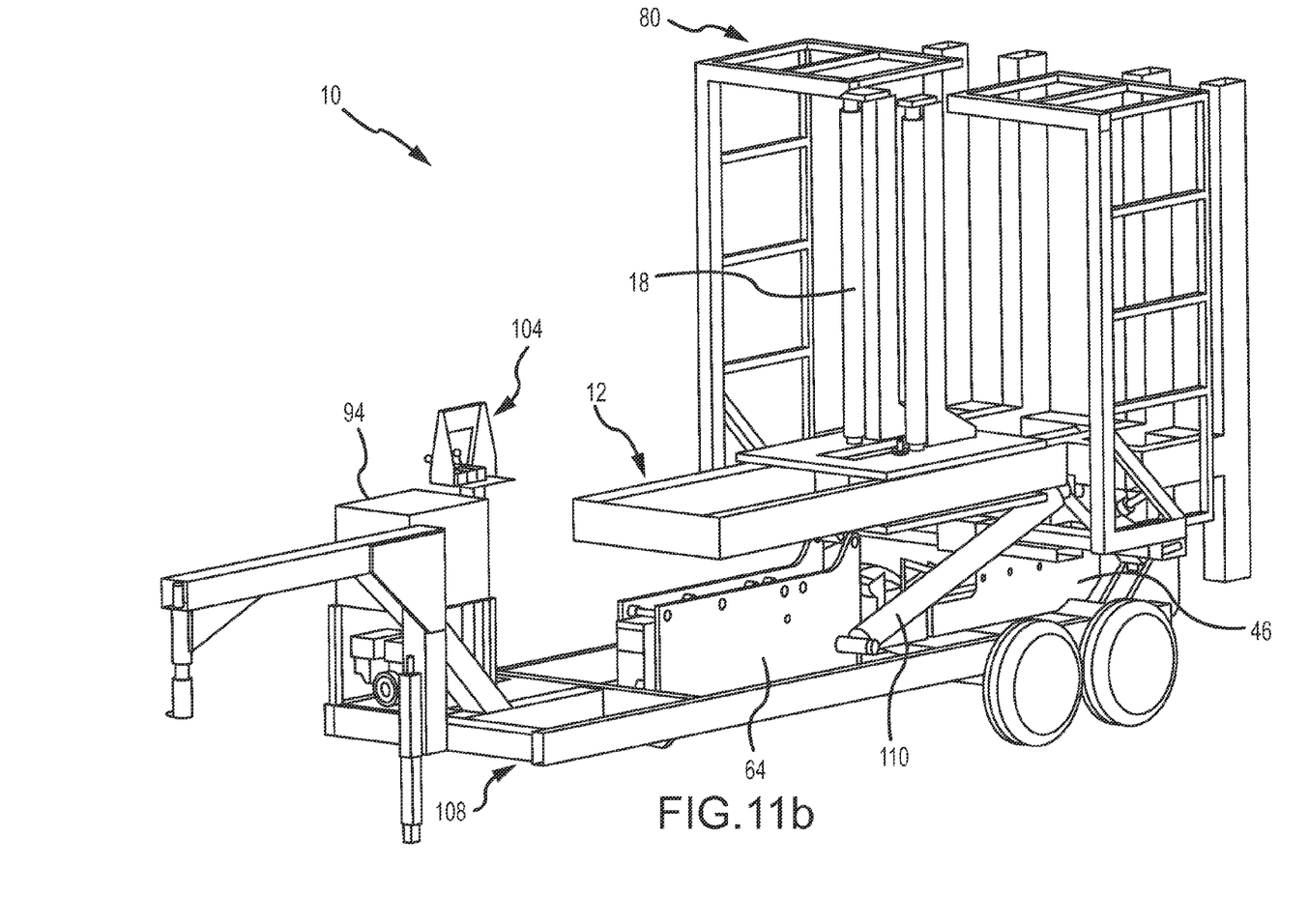
FIG. 11b depicts a front perspective view of the tire bead removing system of FIG. 11a and one manner in which the system may be supported on a mobile trailer in a storage and transport position.

With reference to FIGS. 11a and 11b, the tire bead removing system may be provided in a portable arrangement, wherein the tire bead removing system 10 is coupled with a trailer 108, which may simply include a wheeled frame and hitch assembly of various configurations. In various embodiments, a loading power cylinder 10 may be associated with the trailer 108 such that it extends between the trailer 108 and the upright portion 16 of the support frame 12. As depicted in FIG. 11, the tire bead removing system 10 may be securely positioned atop a ground or operating surface with the loading power cylinder 110 extending between the base portion 14 and the trailer 108 in an extended position. When it is desired to load the tire bead removing system 10 into a transport position, the loading power cylinder 110 may be retracted, tipping the tire bead removing system 10 in a rearward direction until the upright portion 16 of the support frame 12 is supported by the frame of the trailer 108, as depicted in FIG. 11b. In various embodiments, the punch arm assembly 46, roller arm retract housing 64, and their associated components, may pivot from a position that is transverse with respect to the upright portion 16 to a position that is more parallel with the upright portion 16, such as depicted in FIG. 11b. In this manner, the tire bead removing system 10 may be placed in a more compact position for transport and storage.

In at least one method of use, the tire bead removing system 10 may be placed in a deployed position, such as depicted in FIG. 11a, when not in a more static location, such as depicted in FIGS. 2a and 2b. The user actuates the control station assembly to open the cage assembly 80 so that a tire may be loaded onto the tire bead removing system 10 using a loader or other such equipment. The tire is positioned so that the roller arm assembly 18 and the punch arm assembly 46 penetrate the central opening of the tire and the beads of the tire rest on the powered roller bar 26 and non-powered roller bar 28. The opposite sidewalls of the tires should be positioned between the opposing punch blades 54 of the punch arm assembly 46. Where tires of different sizes are used, the operator may adjust the distance between the punch blades 54, accordingly. Once the tire is securely positioned on the tire bead removing system 10, the cage assembly may be actuated to move into a closed or secure position around the tire. The operator may then actuate the punch arm assembly 46 controls so that one or both of the punch power cylinders 56 are actuated and drive the punch blade mounts 52 and punch blades 54 toward one another until they engage and penetrate the sidewalls of the tire. The punch power cylinders 56 are again actuated in a reverse order in order to retract the punch blades 54. The powered roller bar 26 is then actuated by the orbit motor 30 to rotate the tire a distance slightly less than a width of the punch blades 54. The process may then be repeated by advancing and retracting the punch blades 54, followed by advancing of the tire with the powered roller bar 26. In various embodiments, the punch arm assembly 46 uses programmable logic controllers to synchronize the punching process with the powered roller bar 26 and slide assembly so that after each punch cut is made, the powered roller bar 26 automatically advances the tire. The operator will continue this process until the tire has completed a full rotation and the tire beads have been severed from the sidewalls of the tire. Once complete, the cage assembly 80 may be actuated to an open position where a loader or other piece of equipment may be used to retrieve the tire from the tire bead removing system 10.

In various embodiments, the powered roller bar 26 could be designed to have a more aggressive gripping roller surface to advance the tire more easily. The powered roller bar 26 could also be designed as a direct drive unit, instead of chain driven.

In some embodiments, it is contemplated that various tire cutting operations may make it desirable to have two or more powered roller bars.

It is contemplated that the cage assembly 80 can be shaped and configured to provide greater coverage of the tire and greater protection to the operator. It could also be designed as an adjustable cage with hinged or sliding extension pieces to further guard the tire. In some embodiments, the cage could be made to hinge over the top of the tire instead of closing around the sides of the tire.

In various embodiments, the control station assembly 104 could be equipped with a handheld remote control that allows the operator greater range of motion around or away from the tire during processing. The control station assembly 104 could be incorporated with the power unit, but it would be subject to noise and vibration that may adversely affect operation. It is also contemplated that the control station assembly 104 and the power unit assembly 94 could also be incorporated as an integral part of the tire bead removing system 10 instead of independent assemblies.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method of using a tire bead removing system comprising: a support frame; an elongate roller, operatively coupled with the support frame such that a length of the roller extends outwardly from the support frame;

a punch arm assembly, operatively coupled with the support frame such that the punch arm assembly is positioned adjacent the elongate roller;

the punch arm assembly including a punch blade operatively coupled with a punch power cylinder that, when actuated, advances and retracts the punch blade in a linear direction; and a controller, operatively coupled with the punch power cylinder, that selectively actuates the punch power cylinder and causes the punch blade to move between advanced and retracted positions;

the method comprising:
positioning a tire on the tire bead removing system, such that the elongate roller and punch arm assembly at least partially penetrate a central opening in the tire, the tire is at least partially supported on the elongate roller, and the punch blade is positioned adjacent a sidewall of the tire;
advancing the punch blade so that it penetrates the sidewall of the tire to form a first sidewall cut;
retracting the punch blade so that it fully withdraws from within the sidewall;
rotating the elongate roller and the tire;
advancing the punch blade so that it penetrates the sidewall of the tire to form a second sidewall cut;
retracting the punch blade so that it fully withdraws from within the sidewall;
repeating the steps of advancing and retracting the punch blade and rotating the elongate roller and tire until a succession of sidewall cuts free a portion of the sidewall containing a tire bead from the tire.

2. The method according to claim 1 wherein:
the elongate roller is operatively coupled with a motor; and
the step of rotating the elongate roller is performed by actuating the motor to rotate the elongate roller and advance the tire rotationally.

3. The method according to claim 2 wherein:
the punch arm assembly further includes a second punch blade, operatively coupled with a second punch power cylinder;
the step of advancing the punch blade is performed simultaneously with advancing the second punch blade so that it penetrates the sidewall of the tire to form a first sidewall cut; and
the step of retracting the punch blade is performed simultaneously with retracting the second punch blade so that it fully withdraws from within the sidewall.

\* \* \* \* \*